June 22, 1926.

H. T. HERR 1,589,391

INTERNAL COMBUSTION ENGINE

Filed April 12, 1921

H. T. Herr
INVENTOR

BY

ATTORNEY

Patented June 22, 1926.

1,589,391

UNITED STATES PATENT OFFICE.

HERBERT T. HERR, OF MERION, PENNSYLVANIA, ASSIGNOR TO WESTINGHOUSE ELECTRIC AND MANUFACTURING COMPANY, A CORPORATION OF PENNSYLVANIA.

INTERNAL-COMBUSTION ENGINE.

Application filed April 12, 1921. Serial No. 460,803.

My invention relates to internal combustion engines and has for an object the provision of a novel and efficient method and apparatus which shall employ air at atmospheric pressure for scavenging the cylinders of an internal combustion engine and in which the burned gases, after being treated to reduce their temperature and specific volume, are withdrawn by entrainment in a stream of water moving at a high velocity. A further object of my invention is to provide, in connection with the construction above designated, a novel and efficient apparatus for the treatment of the exhausted gases in which the heat of the gases is utilized to generate a motive fluid and in which provision is made for supplying an auxiliary source of heat for the further generation of the motive fluid.

These and other objects which will be made manifest throughout the further description of my invention, are attained by means of apparatus described herein and illustrated in the accompanying drawing in which—

Figure 1:
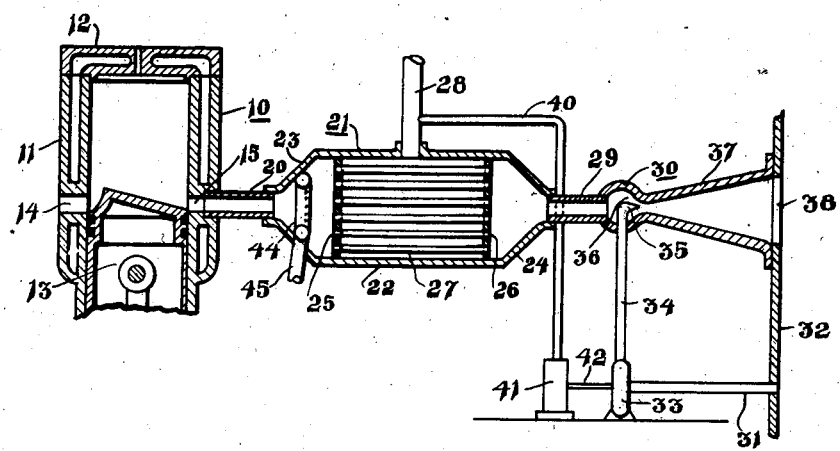
Figure 2:
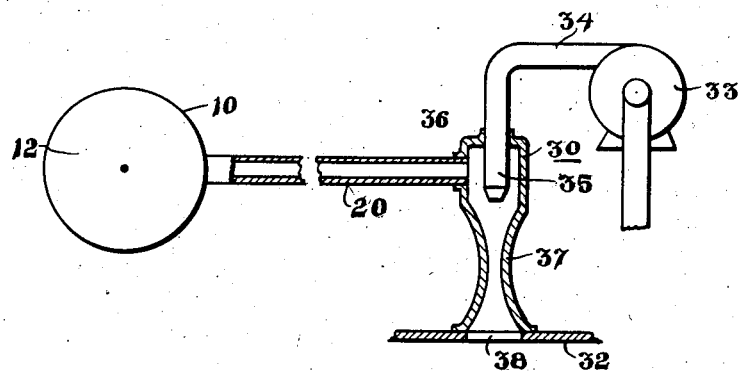

Figure 1 is a view, partially in section and partially in elevation, of an internal combustion engine equipped with a mechanism embodying my invention, and Figure 2 is a horizontal sectional view of a modified form of an ejector adapted for employment with the apparatus illustrated in Figure 1.

Low pressure, or sub-atmospheric exhaust systems of scavenging internal combustion engines of the two-cycle type have the distinct advantage of performing the scavenging operation satisfactorily and at the same time of operating independently of the moving parts of the engine. The effectiveness of a low pressure exhaust apparatus, however, depends largely upon the ability of the device to maintain economically the necessary pressure difference of from 6 to 10 pounds between the air inlet ports and the exhaust ports of the engine cylinder. This necessitates the maintenance of a vacuum of from 5 to 9 pounds absolute within the exhaust passages of the engine.

This result is attained in my novel construction by the interposition between the exhaust ports and the evacuating device of a chamber of considerable capacity. The evacuating device operating continuously, maintains a high degree of vacuum within the chamber, so that the momentary rush of high pressure gases occurring at the opening of the exhaust ports is diffused throughout the chamber with no considerable rise of pressure therein.

A considerable reduction in the energy required to evacuate the gases is effected by causing the gases to be cooled while passing through the chamber, thus reducing the specific volume of the gases. Moreover, the heat withdrawn from the gases is available for the generation of a motive fluid which may be used to operate the evacuating mechanism or for other purposes.

A further economy in operation may be attained, especially where an abundant supply of water is available, as in marine installations, by employing water as an entraining medium for evacuating the burned gases. For this purpose an entrainment pump of any well known type, as the ejector pump or the fluid piston pump may be utilized.

Referring to the drawing for a more detailed understanding of my invention, a two-cycle internal combustion engine is indicated at 10, which comprises a cylinder 11, a head 12, a piston 13, piston-controlled air inlet ports 14 and exhaust ports 15.

The exhaust gases from the ports 15 are conducted by a manifold 20 into a chamber 21. The chamber 21 may be of any suitable construction and should preferably have a large gas space and means for effecting a transfer of heat from the exhausted gases to a cooling medium. As shown, the chamber 21 comprises a cylindrical body portion 22 enclosing end members 23, 24 tube sheets 25, 26 secured to the cylindrical portion 22 and tubes 27 extending between the tube sheets and affixed thereto in any suitable manner. A motive fluid discharge pipe 28 communicates with space between the tube sheets. The manifold 20 preferably enters the end member 23 centrally thereof, and a discharge pipe 29 leads from the central portion of the end member 24 to an evacuating device 30.

The evacuating device 30 is constructed to employ water as an entraining fluid. In the drawing, an installation adapted for marine use is shown, the water being taken from the sea through a pipe 31 which extends through the side 32 of the vessel. The water is led to a centrifugal pump 33 of the usual construction and thence discharged at a high velocity through a pipe 34 and a nozzle 35 into an entraining chamber 36 of the evacuating device 30. The water and entrained gases are directed into a diffuser 37 and discharged overboard through a port 38. It is to be understood, however, that the evacuation device is not limited to use in connection with marine power plants and that the water for entraining the burned gases may be taken from any suitable source and the discharge carried away in any convenient manner.

Power for driving the centrifugal water pump may be preferably supplied from the chamber 21. I have illustrated a branch pipe 40 leading from the steam off-take 28 to a suitable turbine 41. The turbine 41 and pump may be mounted upon the same shaft 42 or a suitable reduction gearing may be interposed between them.

Provision is further made for generating power in the generator 21 by providing an auxiliary heating means, which may be of a type in which a self-combustible gas mixture is supplied to a burner 44 through a pipe 45. This construction enables pressure fluid to be withdrawn from the generator for power purposes when the internal combustion engine is idle.

The operation of the apparatus is apparent from the above description. In brief, the exhaust device 30 operates continuously to provide a high degree of vacuum within the chamber 21. The exhaust gases from the engine 10 discharge through the ports 15 and manifold 20 into the chamber 21, the gases at the first opening of the port 15 having a considerable pressure which is immediately reduced upon the gases entering the chamber 21, resulting in a low absolute pressure in the manifold 20. During the remainder of the period in which the exhaust ports are open, air at atmospheric pressure rushes in through the ports 14 and thoroughly sweeps the residue of burned gases into the manifold 20 and chamber 21, and also fills the cylinder with a fresh charge of air.

The gases entering the chamber 21 are drawn at a high velocity through the tube 27 and their temperature and specific volume greatly reduced because of the heat transfer to the fluid surrounding the tubes. These cool and relatively dense burned gases are then evacuated by entrainment in the stream of water discharged from the nozzle 35, the work of entrainment being greatly decreased by the reduction in the volume of gases necessary to be handled by the ejector.

The heat extracted from the gases in their passage through the chamber 21 is utilized to generate a motive fluid, as for example, steam, which may be withdrawn through pipe 28 for any desired use. A part of the motive fluid is led to the turbine 41 which drives the centrifugal pump 33 for supplying water to the ejector at high velocity.

The use of steam for furnishing power to an auxiliary engine to assist the main engine 10 may also be desirable in certain installations, in which, should the internal combustion engine 10 break down, the auxiliary steam engine may be the sole source of motive power. Provision is therefore made for supplying an auxiliary source of heat to the chamber 21 under which conditions the products of combustion from the burner 44 are drawn through the tubes 27 and evacuated by the ejector, providing, in effect, an induced-draft, gas-fired furnace, the efficiency of which compares favorably with small steam generator installations.

It may, in certain installations, be desirable to exhaust the gases directly from the cylinder of the internal combustion engine to the ejector. In Fig. 2 I have illustrated such an arrangement. Gases from the engine 10 are conveyed by the manifold directly to the ejector 30, where they are entrained by a jet of water from the nozzle 35 and discharged through the diffuser 37 and port 38.

The apparatus illustrated in Fig. 2 serves to effect the scavenging of the cylinder 10 in the same manner as described above in relation to Fig. 1. The stream of water discharged by the nozzle 35 through the ejector 30 operates to maintain a high vacuum within the exhaust manifold 20. After the first rush of gases from the cylinder into the manifold, which causes the pressure therein to momentarily rise, air at atmospheric pressure is forced into the cylinder, due to the pressure differences at the inlet and outlet ports, and sweeps out the remaining burned gases, leaving the cylinder filled with pure air for a succeeding charge.

Water is especially effective as a motive fluid for the ejection of the burned gases of an internal combustion engine since it causes the condensation of the condensable portion of the exhaust gases, in which there is a high per cent of condensable vapor present, and thereby reduces the work of compression of the gases which necessarily takes place when vacuous conditions are maintained in the exhaust passages of the engine.

While I have shown my invention in but one form, it will be obvious to those skilled in the art that it is not so limited, but is susceptible of various other changes and modifications, without departing from the spirit thereof, and I desire, therefore, that only such limitations shall be placed thereupon as are imposed by the prior art or as are specifically set forth in the appended claims.

What I claim is:

1. In an internal combustion engine, having a cylinder with air inlet and exhaust ports, a conduit receiving the burned gases from the exhaust port, a low-pressure chamber communicating with said conduit, a steam generator within said chamber, an ejector communicating with said chamber for maintaining therein a sub-atmospheric pressure, and means including an engine operated by steam from the generator and a pump driven by the engine for supplying a stream of rapidly flowing water to said ejector to entrain and discharge the burned gases.

2. In an internal combustion engine, having a cylinder with air inlet and exhaust ports, a conduit receiving the burned gases from the exhaust port, a low-pressure chamber communicating with said conduit, a steam generator within said chamber, arranged to absorb heat from the hot combustion gases, a supplemental heating means within said chamber, an ejector communicating with said chamber for maintaining therein a sub-atmospheric pressure, and means including an engine operated by steam from the generator and a pump driven by the engine for supplying a stream of rapidly flowing water to said ejector to entrain and discharge the burned gases.

In testimony whereof, I have hereunto subscribed my name this 29th day of March, 1924.

HERBERT T. HERR.